United States Patent
Wanni et al.

(10) Patent No.: US 9,498,738 B2
(45) Date of Patent: Nov. 22, 2016

(54) FIELD ENHANCED SEPARATION APPARATUS

(71) Applicants: Amar S. Wanni, Fairfax, VA (US); Lei Zhang, Bridgewater, NJ (US); Jason M. McMullan, Houston, TX (US); Gregory J. DeMartin, Flemington, NJ (US); Michel Daage, Hellertown, PA (US)

(72) Inventors: Amar S. Wanni, Fairfax, VA (US); Lei Zhang, Bridgewater, NJ (US); Jason M. McMullan, Houston, TX (US); Gregory J. DeMartin, Flemington, NJ (US); Michel Daage, Hellertown, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 209 days.

(21) Appl. No.: 14/334,836

(22) Filed: Jul. 18, 2014

(65) Prior Publication Data
US 2016/0016097 A1    Jan. 21, 2016

(51) Int. Cl.
*B01D 17/00*    (2006.01)

(52) U.S. Cl.
CPC .................................. *B01D 17/005* (2013.01)

(58) Field of Classification Search
None
See application file for complete search history.

(56) References Cited

U.S. PATENT DOCUMENTS

| | | | |
|---|---|---|---|
| 2,541,069 A | 2/1951 | Jones et al. | |
| 2,541,070 A | 2/1951 | Jones et al. | |
| 2,541,071 A | 2/1951 | Jones et al. | |
| 2,585,244 A | * 2/1952 | Hanson | B01D 17/005 210/176 |
| 2,712,386 A | 7/1955 | Jones et al. | |
| 2,720,975 A | 10/1955 | Jones et al. | |
| 2,720,976 A | 10/1955 | Jones | |
| 2,720,977 A | 10/1955 | Jones | |
| 2,720,978 A | 10/1955 | Jones et al. | |
| 2,720,979 A | 10/1955 | Jones | |
| 2,720,980 A | 10/1955 | Thomas | |
| 2,723,033 A | 11/1955 | Jones et al. | |
| 2,723,034 A | 11/1955 | Jones | |
| 2,723,758 A | 11/1955 | Lupfer et al. | |
| 2,723,759 A | 11/1955 | Scovill | |
| 2,737,297 A | 3/1956 | Gardner | |
| 2,742,154 A | 4/1956 | Jones et al. | |
| 2,743,013 A | 4/1956 | Jansma | |
| 2,743,014 A | 4/1956 | Frazier | |
| 2,743,015 A | 4/1956 | Jansma | |
| 2,751,082 A | 6/1956 | Gary | |
| 2,752,042 A | 6/1956 | Scovill | |
| 2,767,849 A | 10/1956 | Marsh | |
| 2,767,850 A | 10/1956 | Marsh | |
| 2,772,782 A | 12/1956 | Jansma | |
| 2,788,321 A | 4/1957 | Thomas | |
| 2,788,322 A | 4/1957 | Dillon | |
| 2,788,900 A | 4/1957 | Thomas | |

(Continued)

OTHER PUBLICATIONS

U.S. Appl. No. 14/132,228, Prentice et al.

(Continued)

*Primary Examiner* — Robert James Popovics
(74) *Attorney, Agent, or Firm* — Larry E. Carter; Robert A. Migliorini

(57) ABSTRACT

Systems and methods are provided for performing field enhanced separations on a feed, such as a petroleum feed, a refinery feed, or another type of hydrocarbonaceous feed. The system can allow for increased throughput of feed per volume of the separation device or system while performing a desired amount of field enhanced separation. The field enhanced separation can include separation by thermal diffusion, optionally enhanced by the presence of an electric field in the channel for performing the separation by thermal diffusion.

20 Claims, 9 Drawing Sheets

(56) References Cited

U.S. PATENT DOCUMENTS

| | | | |
|---|---|---|---|
| 2,789,088 A | 4/1957 | Thomas | |
| 2,789,089 A | 4/1957 | Wishart | |
| 2,789,945 A | 4/1957 | Thomas | |
| 2,789,946 A | 4/1957 | Thomas | |
| 2,790,660 A | 4/1957 | Jones | |
| 2,791,332 A * | 5/1957 | Henke | B01D 17/005 210/775 |
| 2,799,395 A | 7/1957 | Wishart | |
| 2,824,647 A | 2/1958 | Frazier | |
| 2,825,463 A | 3/1958 | Thomas | |
| 2,827,171 A * | 3/1958 | Frazier | B01D 17/005 210/176 |
| 2,827,172 A * | 3/1958 | Frazier | 159/31 |
| 2,827,173 A | 3/1958 | Jones | |
| 2,834,440 A | 5/1958 | Berg | |
| 2,834,464 A * | 5/1958 | Fellows | B01D 17/005 210/176 |
| 2,834,467 A * | 5/1958 | Thomas | B01D 17/005 210/176 |
| 2,834,468 A | 5/1958 | Thomas et al. | |
| 2,850,167 A | 9/1958 | Fink | |
| 2,852,578 A | 9/1958 | Gardner et al. | |
| 2,862,621 A | 12/1958 | Asmus | |
| 2,892,544 A | 6/1959 | Jones | |
| 2,905,527 A * | 9/1959 | Dole | B01D 59/16 210/176 |
| 2,968,403 A * | 1/1961 | Abelson | B01D 59/16 210/775 |
| 2,991,886 A * | 7/1961 | Thomas | B01D 17/005 210/176 |
| 2,996,455 A | 8/1961 | Brown et al. | |
| 3,180,823 A | 4/1965 | Stothers et al. | |
| 6,082,445 A * | 7/2000 | Dugan | F28D 9/0081 165/167 |
| 6,783,661 B1 | 8/2004 | Briot et al. | |
| 2016/0016097 A1* | 1/2016 | Wanni | B01D 17/005 210/176 |

OTHER PUBLICATIONS

U.S. Appl. No. 14/132,206, Prentice et al.
Grasselli, R. et al., "Full-scale thermal diffusion equipment," Chemical Engineering Progress, 1961, vol. 57, No. 5, pp. 59-64.
Bau, H., "Optimization of conduits' shape in micro heat exchangers," International Journal of Heat and Mass Transfer, 1998, vol. 41, No. 18, pp. 2717-2723.
Jones, A., "Lubricating Oil Fractions Produced by Thermal Diffusion," Industrial and Engineering Chemistry, 1951, vol. 47, No. 2, pp. 212-215.
Grasselli, R. et al., "A Comparative Study of Continuous Liquid Thermal Diffusion Systems," I&EC Process Design and Development, 1962, vol. 1, No. 4, pp. 241-248.
Kuchinov, V.P. et al., "Separation of Liquid Mixtures by Thermodiffusion Through an Electric Field," Atomnaya Energiya, 1971, vol. 32, No. 2, pp. 167-169.
Jones, A. "Liquid Thermal Diffusion . . . A Continuous Separation Process," Petroleum Processing, 1951, vol. 6, pp. 132-135.

* cited by examiner

| ENERGY * GAP / DT / 1000M² (MW*MM/(1000M²*K)) | 0.12 |
|---|---|
| DT PROCESS (CURRENT – STEAM) K | 5.10 |
| GAP (CURRENT) MM | 0.254 |

| | | | | | SCALING FACTOR ON GRADIENT | 12.2 |
|---|---|---|---|---|---|---|

| GAP WIDTH (MM) | N_GAP / MOD | A_PLATE / MOD (M²) | V_FLUID / MOD (M³) | T_GRADIENT (K/MM) | RESIDENCE TIME (HR) | | | | | |
|---|---|---|---|---|---|---|---|---|---|---|
| | | | | | 2 | 4 | 6 | 8 | 10 | 20 |
| 0.3 | 246 | 982.7 | 0.3 | 17.0 | 674 | 1348 | 2022 | 2696 | 3370 | 6741 |
| | | | | | 1351 | 2704 | 4054 | 5406 | 6757 | 13514 |
| 0.5 | 240 | 958.2 | 0.5 | 10.2 | 415 | 830 | 1244 | 1659 | 2074 | 4148 |
| | | | | | 487 | 973 | 1460 | 1946 | 2433 | 4865 |
| 1.0 | 225 | 901.5 | 0.9 | 5.1 | 220 | 441 | 661 | 882 | 1102 | 2204 |
| | | | | | 122 | 243 | 365 | 487 | 608 | 1216 |
| 2.0 | 202 | 806.9 | 1.6 | 2.6 | 123 | 246 | 369 | 498 | 616 | 1232 |
| | | | | | 30 | 61 | 91 | 122 | 152 | 304 |
| 3.0 | 183 | 730.0 | 2.2 | 1.7 | 91 | 181 | 272 | 363 | 454 | 907 |
| | | | | | 14 | 27 | 41 | 54 | 68 | 135 |

FIG. 9

| ENERGY * GAP / DT / 1000M² (MW*MM/(1000M²*K)) | 0.12 |
|---|---|
| DT PROCESS (CURRENT – STEAM) K | 62.24 |
| GAP (CURRENT) MM | 0.254 |

| SCALING FACTOR ON GRADIENT | 12.2 |
|---|---|

| GAP WIDTH (MM) | N_GAP / MOD | A_PLATE / MOD (M²) | V_FLUID / MOD (M³) | TGRADIENT (K/MM) | RESIDENCE TIME (HR) | | | | | | |
|---|---|---|---|---|---|---|---|---|---|---|---|
| | | | | | 0.16 | 0.33 | 0.49 | 0.66 | 0.82 | 1.64 | |
| 0.3 | 246 | 982.7 | 0.3 | 207.5 | 55 | 111 | 165 | 221 | 276 | 553 |
| | | | | | 1332 | 2704 | 4055 | 5407 | 6739 | 13518 |
| 0.5 | 240 | 958.2 | 0.5 | 124.5 | 34 | 68 | 102 | 136 | 170 | 340 |
| | | | | | 487 | 973 | 1450 | 1947 | 2433 | 4867 |
| 1.0 | 225 | 901.5 | 0.9 | 62.2 | 18 | 36 | 54 | 72 | 90 | 181 |
| | | | | | 122 | 243 | 365 | 487 | 608 | 1217 |
| 2.0 | 202 | 806.9 | 1.6 | 31.1 | 10 | 20 | 30 | 40 | 50 | 101 |
| | | | | | 30 | 61 | 91 | 122 | 152 | 304 |
| 3.0 | 183 | 730.0 | 2.2 | 20.7 | 7 | 15 | 22 | 30 | 37 | 74 |
| | | | | | 14 | 27 | 41 | 54 | 68 | 135 |

FIG. 10

FIELD ENHANCED SEPARATION APPARATUS

FIELD

This disclosure provides systems and methods for separating petroleum fractions and other hydrocarbon fractions in the presence of thermal fields and/or electric fields.

BACKGROUND

A general problem during petroleum processing is separating desirable fractions of a petroleum (hydrocarbon) stream from other fractions that are less desirable or are desirable for a different purpose. A common example of a separation is to separate a lower boiling fraction, such as a diesel boiling range fraction, from a higher boiling fraction, such as a lubricant boiling range fraction. While separations based on boiling point are well understood, many desirable qualities in a petroleum fraction are not directly correlated with boiling point.

Liquid thermal diffusion provides a method for performing a liquid separation that is an alternative to boiling point based separations. U.S. Pat. Nos. 2,541,069 and 3,180,823 are early examples of using liquid thermal diffusion to separate hydrocarbon fractions, such as lubricant boiling range fractions. U.S. Pat. No. 3,180,823 also describes use of an additive to facilitate a liquid thermal diffusion process, and the withdrawal of multiple different fractions during a separation.

U.S. Pat. No. 6,783,661 describes a method of using liquid thermal diffusion for separation of a residue or bottoms fraction from a process for converting a distillate boiling range feed. The liquid thermal diffusion is used to separate the bottoms fraction based on viscosity index. A portion of the bottoms fraction can then be recycled for further processing.

SUMMARY

In an aspect, a system for performing a field enhanced separation is provided. The system includes a heating fluid channel comprising: heating fluid channel parallel plates separated by a heating fluid channel width, the heating fluid channel parallel plates each having an interior surface and an exterior surface, the interior surfaces of the heating fluid channel parallel plates defining a heating fluid channel volume, the heating fluid channel parallel plates corresponding to a first heating plate and second heating plate; a first open cell framework structure within the heating fluid channel volume, the first open cell framework structure contacting the interior surfaces of the first heating plate and the second heating plate at a plurality of points; at least one heating fluid inlet; and at least one heating fluid outlet, the first open cell framework structure providing fluid communication between the at least one heating fluid inlet and the at least one heating fluid outlet; a cooling fluid channel comprising: cooling fluid channel parallel plates separated by a cooling fluid channel width, the cooling fluid channel parallel plates each having an interior surface and an exterior surface, the interior surfaces of the cooling fluid channel parallel plates defining a cooling fluid channel volume, the cooling fluid channel parallel plates corresponding to a first cooling plate and second cooling plate; a second open cell framework structure within the cooling fluid channel volume, the second open cell framework structure contacting the interior surfaces of the first cooling plate and the second cooling plate at a plurality of points; at least one cooling fluid inlet; and at least one cooling fluid outlet, the second open cell framework structure providing fluid communication between the at least one heating fluid inlet and the at least one heating fluid outlet; a process fluid channel formed by the exterior surface of the first heating plate and the exterior surface of the first cooling plate, the exterior surface of the first heating plate and the exterior surface of the first cooling plate being substantially parallel, the process fluid channel having a process fluid channel width of from about 0.25 mm to about 6.0 mm, at least one process fluid input in fluid communication with the process fluid channel; and a plurality of process fluid output ports in fluid communication with the process fluid channel, the plurality of process fluid output ports being at two or more different heights relative to a height of the process fluid channel. Optionally, the system can further include electrodes for providing an electric field within the process fluid channel.

BRIEF DESCRIPTION OF THE DRAWINGS

FIGS. 9 and 10 show results from calculation for residence time and energy use for performing thermal diffusion separations on a feedstock.

DETAILED DESCRIPTION

Figure 1:
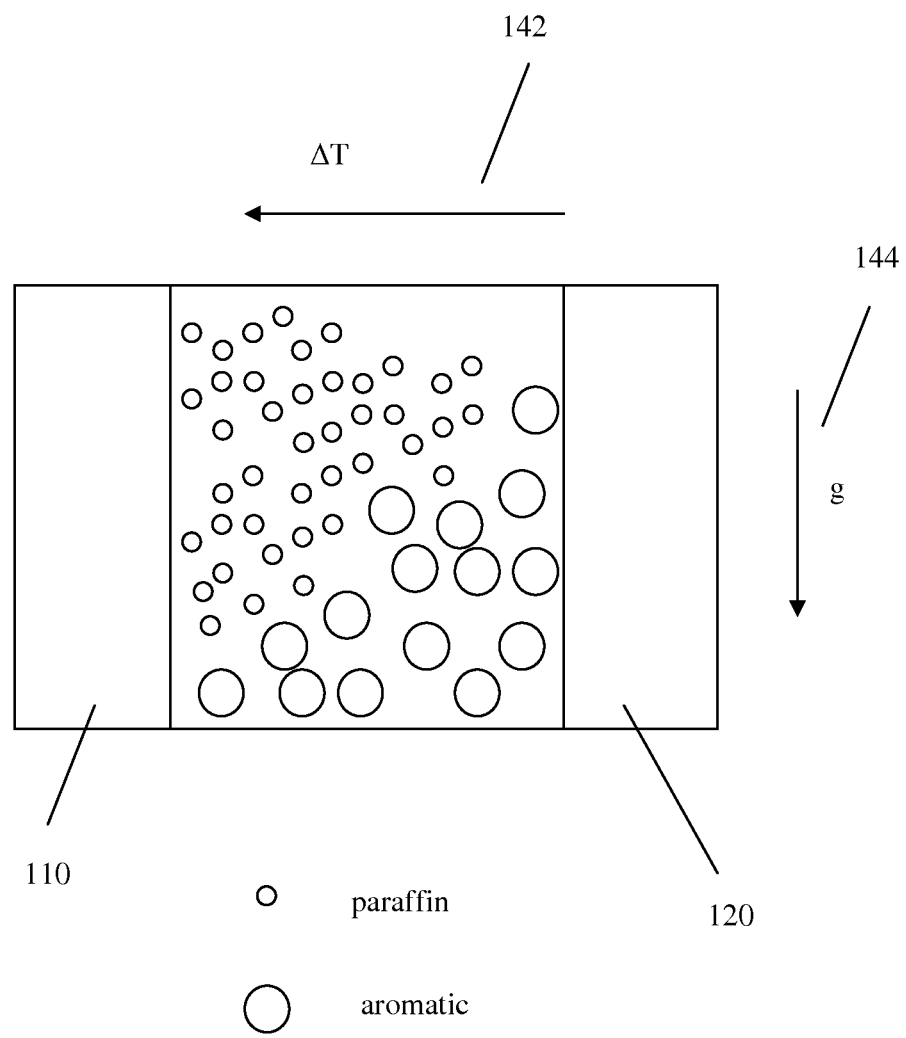
FIG. 1 schematically shows an example of performing a separation by liquid thermal diffusion.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing field enhanced separations on a feed, such as a petroleum feed, a refinery feed, or another type of hydrocarbonaceous feed. The system can allow for increased throughput of feed per volume of the separation device or system (i.e., reduced residence time) while performing a desired amount of field enhanced separation. The field enhanced separation can include separation by thermal diffusion, optionally enhanced by the presence of an electric field in the channel for performing the separation by thermal diffusion.

A liquid thermal separation according to some aspects of the disclosure is designed to provide a separation in a reduced or minimized residence time for a desired degree of separation. The enhanced separation can be enabled in part by the ability to provide an increased temperature differential across the process fluid channel. A heating fluid channel and a cooling fluid channel can be used to provide the temperature differential across the process fluid channel. The integrity of the plates used to separate the various channels can be improved or enhanced by use of an open framework structure within the heating channel and the cooling channel. The use of an open framework structure can allowing fluids to pass through the heating and cooling channels while maintaining the plates of the channels to be substantially parallel to within a specified tolerance. This can allow an increased temperature differential to be maintained while also maintaining a desired width for the process fluid channel.

Conventionally, petroleum fractions (including feedstock and partially or fully processed products) have been separated primarily based on the boiling point of the various compounds. Boiling point separations can be used to generate a variety of fractions from a petroleum feed, such as naphtha fractions or distillate fractions. However, modification of properties within a boiling range must be achieved by another method, such as by hydroprocessing or solvent extraction.

Separations by liquid thermal diffusion provide another alternative and/or complement to boiling point separations. Instead of providing a separation based on boiling point, liquid thermal diffusion results in a separation based on molecular shape and density that roughly correlates with viscosity index. This separation can be performed without the use of additional solvents or other additives. Optionally, a liquid thermal diffusion separation can be further enhanced by applying a variable electric field during the separation.

One of the difficulties with conventional systems for performing liquid thermal diffusion or other field enhanced separations is achieving a level of throughput that is commercially useful. Conventional methods of using liquid thermal diffusion have involved building large separation devices to handle commercial scale volumes of feed. Unfortunately, such large devices also involve long residence times for performing a separation and/or require a large footprint of equipment relative to the amount of volume passing through the separator. Also, the large surface areas required for a commercial scale separator result in high energy consumption and create difficulties in maintaining a consistent temperature differential between the hot and cold surfaces of a separator. Additionally, the large surface areas can pose difficulties in maintaining a desired width in the channel for performing the fluid separation.

Feedstock and Separation Products

In the discussion herein, reference will be made to petroleum, chemical, and/or hydrocarbonaceous feedstocks. With regard to hydrocarbonaceous feedstocks, unless specifically noted otherwise, it is understood that hydrocarbonaceous feedstocks include feedstocks containing hydrocarbons but also containing levels of impurity atoms typically found in a feedstock derived from a petroleum mineral source and/or a biological source. For example, a hydrocarbonaceous feedstock could include several weight percent of sulfur, nitrogen, or oxygen, depending on whether the feedstock is of biological or mineral origin as well as the specific source of the feedstock.

In some alternative aspects, a hydrocarbon feedstock composed substantially of carbon and hydrogen can be used. In such alternative aspects, a hydrocarbon feedstock composed substantially of carbon and hydrogen is defined as a feedstock containing less than 1 wt % of atoms other than carbon and hydrogen, such as less than 0.5 wt % and preferably less than 0.1 wt %.

A wide range of petroleum and chemical feedstocks can be separated using a field enhanced separation technique, such as separation via liquid thermal diffusion in the presence of a thermal field gradient. Some examples of suitable feedstocks correspond to feedstocks that correspond to distillate boiling range or heavier materials. Such feedstocks can include, but are not limited to, atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, Fischer-Tropsch waxes, oil in wax streams, raffinates, other effluents or fractions of effluents derived from hydroprocessing of one of the above types of feedstocks, and mixtures of these materials. In addition, non-conventional feedstocks may be employed such as bio based feeds or lubricants. Other feeds may include polymers and/or C30+ linked molecular streams in order to isolate key polymers and/or certain shaped linked C30+ molecules (multiring structures that actually preserve the viscosity of single rings).

Some typical feedstocks include, for example, vacuum gas oils and/or other feedstocks with an initial boiling point of at least about 350° C. (660° F.), such as about 371° C. (700° F.). Alternatively, a feed can be characterized based on a T5 boiling point. A T5 boiling point refers to the temperature at which 5 wt % of a feed will boil. Thus, a typical feed can have a T5 boiling point of at least about 350° C., such as at least about 371° C. The final boiling point of the feed can be about 593° C. (1100° F.) or less, such as 566° C. (1050° F.) or less. Alternatively, a feed can be characterized based on a T95 boiling point, which refers to a temperature where 95 wt % of the feed will boil. In some aspects, the T95 boiling point of a feed can be 593° C. or less, such as 566° C. or less. In other aspects, a portion of the feed can correspond to molecules typically found in vacuum tower bottoms, so that the upper end of the boiling range for the feed will be dependent on the source of the feedstock.

Other typical feedstocks include, for example, feeds with a broader boiling range, such as feeds that also include distillate fuel boiling range molecules. Such feedstocks can include molecules having a boiling range corresponding to vacuum distillation bottoms, or such heavy molecules may be excluded so that the heaviest molecules in the feedstock correspond to molecules boiling in the vacuum gas oil range. For a feedstock including distillate fuel boiling range molecules, a typical feedstock can have, for example, an initial boiling point of at least about 200° C. (392° F.), such as at least about 225° C. (437° F.) or at least about 250° C. (482° F.). Alternatively, a feed can be characterized based on a T5 boiling point. A T5 boiling point refers to the temperature at which 5 wt % of a feed will boil. Thus, a typical feed can have a T5 boiling point of at least about 225° C., such as at least about 250° C. or at least about 275° C. In aspects where the feed does not include molecules typically found in vacuum distillation bottoms, the final boiling point of the feed can be about 600° C. or less, such as about 593° C. (1100° F.) or less, or about 566° C. (1050° F.) or less, or about 538° C. (1000° F.) or less. Alternatively, the T95 boiling point of the feed can be about 593° C. or less, such as about 566° C. or less or about 538° C. or less. In other aspects, a portion of the feed can correspond to molecules typically found in vacuum tower bottoms, so that the upper end of the boiling range for the feed will be dependent on the source of the feedstock.

Liquid Thermal Diffusion

FIG. 1 conceptually shows the operation of a liquid thermal diffusion separator. In FIG. 1, a liquid thermal diffusion separator includes a hot wall or surface 110 and a cold wall or surface 120. In this conceptual example, the terms hot and cold indicate the relative temperatures of surfaces 110 and 120, with hot surface 110 being at a higher temperature than cold surface 120. The hot surface 110 and cold surface 120, in combination with a top surface and a bottom surface, define a process fluid channel or gap 130. In this example, the length of the process fluid channel or gap 130 is not defined, as the channel length corresponds to a dimension perpendicular to the plane of the page. As an example, cold surface 120 could have a temperature of 150° F. (66° C.) while the hot surface is at a temperature of 300° F. (149° C.). The direction of the temperature gradient 142 and gravitational pull 144 is also shown in FIG. 1. Typically, a liquid thermal diffusion separator is oriented so that the direction of gravitational pull is roughly orthogonal to the direction of the temperature gradient. This allows a separation to be performed based on molecular shape and density.

In the conceptual example shown in FIG. 1, a fluid in the process fluid channel or gap 130 between surfaces 110 and 120 would undergo liquid thermal diffusion due to the temperature differential. Molecules with higher viscosity index values, such as paraffins, will tend to congregate in the upper portion of gap 130. Molecules with lower viscosity index values, such as aromatics, will tend to congregate in the lower portion of gap 130. Two or more outlets positioned along the vertical direction of the gap 130 can then be used to withdraw fractions with differing viscosity index values.

Although not shown in FIG. 1, the surfaces 110 and 120 in FIG. 1 can correspond to walls that are shared in common with heating fluid channels and cooling fluid channels. For example, hot surface 110 can correspond to a wall separating gap or process fluid channel 130 from a heating fluid channel. Similarly, cool surface 120 can represent a wall or other structure separating gap 130 from a cooling fluid channel.

In a liquid thermal diffusion separator, several geometric values are relevant for determining the operation of the separator. These values include the separation volume width of the gap or separation volume containing the liquid being separated; the height of the separation volume; and the temperature differential between the hot and cold surfaces that define the gap or separation volume. In various aspects, a desirable separation can be performed using a separator with a smaller than conventional value for the ratio of separation volume height to separation volume width.

The width of the process fluid separation channel is defined as the distance between the hot and cold surfaces in the separator. Typically, the width of the process fluid channel will be in a direction that is orthogonal or roughly orthogonal to the direction of gravitational force. In some aspects, liquid thermal diffusion separations are performed in a separator with a process fluid separation channel width of at least about 0.25 mm, or at least about 0.5 mm, or at least about 0.75 mm. Preferably, the process fluid channel width can be at least about 1.0 mm, or at least about 1.25 mm, or at least about 1.5 mm. In order to provide an effective separation based on liquid thermal diffusion, there can be practical limits to the width of the process fluid channel. As a result, the separation volume width can be 6.0 mm or less, or about 5.0 mm or less, or about 4.0 mm or less, or about 3.0 mm or less. Each of the above upper and lower bounds is explicitly contemplated as a combination. Thus, for example, the process fluid channel width can be from about 0.25 mm to about 6.0 mm, or from about 0.5 mm to about 6.0 mm, or from about 1.0 mm to about 6.0 mm, or from about 1.25 mm to about 6.0 mm, or from about 1.5 mm to about 6.0 mm, or from about 0.25 mm to about 5.0 mm, or from about 0.25 mm to about 4.0 mm, or from about 1.0 mm to about 5.0 mm, or any other combination of the explicitly recited upper and lower bounds. It is noted that the width of the process fluid channel can vary, although it is preferable in many aspects to maintain a substantially constant width for the process fluid channel. For a process fluid channel with a variable width, the width is defined as the width based on an average over the full surface area over which the cold surface of the process fluid channel faces the hot surface of the process fluid channel.

In some aspects, the height of the process fluid channel (and/or of the corresponding heating fluid channels or cooling fluid channels) is defined as a dimension that is approximately parallel to the direction of gravitational force. Additionally or alternately, in some aspects the process fluid separation channel height can be selected to achieve a desired amount of separation. For example, the process fluid channel height can be about 3.0 m (3000 mm or 9.8 feet) or less, or about 2.5 m or less, or about 2.0 m or less. The process fluid channel height can be at least about 0.25 m (250 mm), or at least about 0.4 m, or at least about 1.0 m, or at least about 1.5 m. Each of the above upper and lower bounds is explicitly contemplated as a combination. Thus, for example, the process fluid channel height can be about 0.25 m to about 3.0 m, or about 0.25 m to about 2.5 m, or about 0.4 m to about 3.0 m, or about 1.0 m to about 3.0 m, or about 0.4 m to about 2.5 m, or any other combination of the explicitly recited upper and lower bounds.

In other aspects, the "height" of the process fluid channel can be aligned in any convenient manner relative to the direction of gravitational force. While gravity can be beneficial in assisting with the thermal diffusion separation, orienting the height of the process fluid channel at an offset angle may be beneficial in some configurations.

Additionally or alternately, in some aspects the ratio of the process fluid channel height to the process fluid channel width is selected to provide a process fluid channel height to process fluid channel width ratio of 1600 or less, such as 1000 or less or 500 or less. The ratio of process fluid channel height to process fluid channel width can be at least 50 and preferably at least 100 or at least 200. Selecting a ratio of process fluid channel height to process fluid channel width defines a balance of factors within a liquid thermal diffusion separator. Reducing the ratio of process fluid channel height to process fluid channel width limits the amount of feedstock that can be processed at one time for a given value of the third process fluid channel dimension. Reducing the ratio also reduces the degree of separation. However, the relaxation time required to achieve the separation is also reduced. By selecting a ratio of process fluid channel height to process fluid channel width that provides a sufficient degree of separation while also providing a sufficiently low relaxation time, the throughput for an individual separation device can be enhanced without requiring an excessive equipment footprint. By using a plurality of enhanced throughput separation devices, a commercial scale of feedstock can be processed.

The remaining dimension of the separation volume, which is orthogonal to the height and the width, can be referred to as the length of the process fluid channel for convenience. The length of the process fluid channel can be any convenient amount so long as a desired level of temperature control can be maintained over the surface area(s) of the hot and cold surfaces. In some aspects the process fluid separation channel length can be selected to achieve a desired amount of separation. For example, the process fluid channel length can be about 3.0 m (3000 mm or 9.8 feet) or less, or about 2.5 m or less, or about 2.0 m or less. The process fluid channel length can be at least about 0.25 m (250 mm), or at least about 0.4 m, or at least about 1.0 m, or at least about 1.5 m. Each of the above upper and lower bounds is explicitly contemplated as a combination. Thus, for example, the process fluid channel length can be about 0.25 m to about 3.0 m, or about 0.25 m to about 2.5 m, or about 0.4 m to about 3.0 m, or about 1.0 m to about 3.0 m, or about 0.4 m to about 2.5 m, or any other combination of the explicitly recited upper and lower bounds.

The temperature differential between the hot and cold surfaces can be selected based on a variety of considerations. One factor is to select a sufficient temperature differential that the separation by liquid thermal diffusion occurs within a desired time frame. The greater the temperature differential is between the hot and cold surfaces, the shorter the relaxation time will be for the separation to reach separation concentration equilibrium. Another factor to consider is the characteristics of the liquid being separated. The cold surface temperature is preferably selected so that the liquid being separated, including the separated fractions resulting from the separation, will remain a liquid. If the cold surface is too cold, a portion of the liquid may crystallize to form a solid and/or form a glass structure during the separation. The kinetics of a liquid thermal diffusion are dependent on the liquid remaining in a fluid state. Thus, formation of a solid or glass phase is not desirable. For the hot surface, the temperature is preferably selected so that the liquid being separated, including the separated fractions resulting from the separation, does not undergo thermal conversion to form coke or other low value products. Additionally, the temperature for the hot surface can preferably be selected so that the liquid being separated, including the separated fractions, does not change phase to form a gas. The formation of a gas phase adjacent to the hot surface can reduce the amount of separation and/or entirely prevent further separation from occurring. Still another factor for selecting the temperatures is whether the temperatures can be controlled effectively during a separation. For example, a cold surface with a temperature near room temperature may save on energy costs, but the temperature of such a cold surface may also be difficult to control if there are temperature swings in the surrounding environment. Having a temperature for the cold surface that is sufficiently different from room temperature, such as a temperature of 100° F. (38° C.) or 149° F. (65° C.), can assist with maintaining a stable temperature differential between the hot and cold surfaces. Yet another consideration can be selecting a suitable average temperature for the process fluid separation channel. For example, a lower average temperature for the process fluid separation channel can result in a higher process fluid viscosity which can lead to a higher separation efficiency.

In general, the temperature differential between the hot surface and the cold surface can be from about 5° C. to about 200° C. From a practical standpoint, a temperature differential of at least about 25° C. is preferable, or at least about 50° C., or at least about 75° C., or at least about 100° C. Having at least about a 25° C. (or at least 50° C. or 75° C.) temperature differential improves (i.e., reduces) the relaxation time or residence time required to achieve an equilibrium concentration gradient in a separation. Additionally or alternatively, the temperature differential between the hot surface and the cold surface can be about 200° C. or less, or about 150° C. or less, or about 125° C. or less, or about 100° C. or less.

During operation of a thermal diffusion separator, the process fluid being separated can be maintained within the process fluid channel for a residence time that is sufficient to achieve a desired level of separation. The residence time for a process fluid in the separation channel can be any convenient amount of time. For example, the residence time can be at least about 0.1 hours, or at least about 0.2 hours, or at least about 0.3 hours, or at least about 0.4 hours, or at least about 0.5 hours, or at least about 0.6 hours, or at least about 0.8 hours, or at least about 1.0 hours, or at least about 1.2 hours, or at least about 1.5 hours, or at least about 2.0 hours. Additionally or alternately, the residence time can be about 8 hours or less, or about 6 hours or less, or about 4 hours or less, or about 2 hours or less, or about 1.8 hours or less, or about 1.5 hours or less, or about 1.2 hours or less, or about 1.0 hours or less. Each of the above upper and lower bounds is explicitly contemplated as a combination. Thus, for example, the residence time can be about 0.1 hours to about 8 hours, or about 0.1 hours to about 2.0 hours, or about 0.2 hours to about 4 hours, or about 0.2 hours to about 2.0 hours, or about 0.3 hours to about 4 hours, or about 0.3 hours to about 2.0 hours, or about 0.4 hours to about 4 hours, or about 0.5 hours to about 4 hours, or about 0.5 hours to about 2.0 hours, or any other combination of explicitly recited values.

In order to illustrate the benefits of a larger value for the ratio of separation volume height to separation volume width, a liquid thermal diffusion separation for a two component system is described below. The principles of operation for a two component system are similar to a multi-component system while providing a more convenient mathematical form.

In a liquid thermal diffusion separation of a two component system, the amount of separation that can be achieved is defined by the equation:

$$\Delta c = \frac{504 L_z}{g L_x^4} \frac{D_T \nu}{\alpha} c_0 (1 - c_0) \tag{1}$$

where $\Delta c$ is the concentration difference between the two ends of a separation volume at steady state, g is the gravitational constant, $L_z$ is the separation volume height, $L_x$ is the separation volume width, $D_T$ is the thermal diffusivity, $\nu$ is the kinematic viscosity, $\alpha$ is the thermal expansion coefficient, and $c_0$ is the initial concentration of a component in the two component mixture. As shown in Equation (1), the amount of separation increases linearly with the height of the separation volume but decreases based on the separation volume width to the fourth power. Thus, reducing the ratio of separation volume height to separation volume width will result in a reduced degree of separation. However, if the reduced degree of separation provided at a given ratio of separation volume height to separation volume width is sufficient, reducing the ratio of separation volume height to separation volume width has advantages for the relaxation time $t_r$ required to achieve the separation shown in Equation (1).

$$t_r = \frac{9!(L_z \nu)^2 D}{(g \pi \alpha \Delta T L_x^3)^2} \tag{2}$$

In Equation (2), D is the molecular diffusivity and $\Delta T$ is the temperature differential between the hot and cold surfaces in the separator. Here, the relaxation time increases as the square of the separation volume height and decreases based on the separation volume width to the sixth power. As shown in Equation (2), reducing the ratio of separation volume height to separation volume width will reduce the relaxation time required to achieve the concentration gradient described by Equation (1).

Multiple Channel Structure for Separation Device

In the various aspects, one or more of the difficulties in performing a field enhanced separation can be reduced or minimized by using a separator constructed to have multiple channels. One channel of the separator can be a separation channel for a process fluid. The fluid to be separated can be introduced into the separation channel in order to perform the field enhanced separation. A second channel can be a channel that provides a heat transfer fluid for the "hot" or higher temperature side of the process fluid channel. The heating fluid channel can contain a fluid for delivering additional heat to the channel wall between the heating fluid channel and the process fluid channel. This can allow the interior wall of the process fluid channel to be maintained at a desired temperature for performing a separation. Similarly, a third channel can be a channel that provides a heat transfer fluid for the "cold" or lower temperature side of the process fluid channel.

Using separate heating channels and cooling channels to manage the temperature of the process fluid separation channel can provide various advantages. Rather than attempting to construct channel walls with internal structures to allow for delivery/absorption of energy to control temperature, the channel walls can instead be constructed from materials that provide suitable heat transfer characteristics. A fluid can then be used in the heating and cooling channels to deliver/absorb energy in order to maintain a desired temperature for a channel wall. By having separate channels for the heating fluid and the cooling fluid (as opposed to attempting to pass a heat transfer fluid through the channel walls), the heating fluid and the cooling fluid can be passed through the heating channel or cooling channel with a reduced or minimal pressure drop. This can allow for desirable flow rates for the heating fluid and/or cooling fluid.

In this discussion, in a structure with multiple channels, the walls defining the heating channels and the cooling channels on either side of a process fluid channel can be referred to as having interior surfaces and exterior surfaces. In this discussion, the interior surfaces of the walls of a heating fluid channel/cooling fluid channel refer to the surfaces that are in contact with the heating fluid or cooling fluid. The exterior surfaces then correspond to the surfaces that are exposed to the process fluid in the process fluid channel.

In order to control the conditions of the field enhanced separation, one of the considerations can be maintaining a desired width for the process fluid separation channel for the full extent of the channel. This can pose some difficulties, as the walls of the process fluid channel are exposed to a temperature gradient. Additionally, the heating fluid channel, the cooling fluid channel, or both may be at a pressure different from the pressure in the process fluid separation channel, which can place further stress on the walls separating the channels. It can also be desirable to reduce or minimize the thickness of the walls of the process channel, so that energy can be delivered/received by the heat transfer fluids in the heating fluid and cooling fluid channels. In order to maintain the desired width for the process fluid separation channel, structures can be used that are internal to the process fluid channel, internal to the heating channel and/or cooling channel, or a combination thereof. The internal structures in the various channels can provide additional structural support to assist in maintaining a desired width for substantially all of the process fluid channel.

One option for an internal structure to improve structural integrity can be structures internal to the heating fluid channel and/or the cooling fluid channel. A desirable internal structure for a heating fluid channel and/or cooling fluid channel can have one or more characteristics. In some aspects, the internal structure can provide support to counter any tendency for the width of the heating fluid channel (or the cooling fluid channel) to be compressed. A separation device can often be constructed to have a large plurality of separation channels with intervening heating fluid channels and cooling fluid channels. The separation device can be part of an overall structure that can provide compression for the assembled plurality of channels. As a result, an external superstructure can provide some support against expansion of channel walls to make the overall assembly larger. However, without sufficient internal structural support, one channel could be compressed with a corresponding expansion of another channel. Thus, by providing an internal structure that can reduce or minimize the ability of channels to individually be compressed, an overall assembly can be provided that can resist both expansion and compression of individual channels.

As noted above; it can be desirable to have a reduced or minimal pressure drop for fluids passing through the heating channel and/or the cooling channel. In order to reduce or minimize the pressure drop within the heating channels and/or cooling channels, the internal structure for supporting the channel walls can correspond to a metallic foam, a wire mesh, or another open cell type structure (also referred to collectively as an "open cell framework structure") that can provide mechanical support for the walls also providing a relatively open structure for passage of a fluid. For example, a reticulated metal foam, such as an aluminum or copper foam, is an example of a metal foam with an open cell framework structure suitable for use as an internal structure within a heating channel or a cooling channel. A wire mesh can similarly be made of any convenient material with a low reactivity to the heat transfer fluid in the heating or cooling channel, such as an aluminum wire mesh, a stainless steel wire mesh, a ceramic wire mesh, or another type of wire mesh to provide an open cell framework structure.

Another consideration when constructing a (modular) apparatus for maintaining a substantially consistent temperature gradient across a narrow process fluid gap is to select materials for the apparatus that have compatible thermal expansion coefficients. Materials with compatible thermal expansion coefficients can expand/contract by similar percentage amounts when exposed to a given temperature. This can allow the various modular parts of an apparatus to expand/contract in a manner that reduces or minimizes stress on the parts. If materials with mismatched thermal expansion coefficients are selected, the walls of the heating fluid channels, cooling fluid channels, and/or the process fluid channels can be exposed to compressive stress that can lead to curvature of a surface. This can disrupt the tight desired tolerances for the process fluid channel of the separation apparatus.

In addition to (or optionally as an alternative to) the internal support structure in the heating channels and cooling channels, support structures or spacers can also be included in the process fluid separation channel. The support structures or spacers in the process fluid separation channel can provide additional support for maintaining a desired width for the process fluid channel while reducing or minimizing the chemical interaction between the spacers and the process fluid. Preferably, the spacers in a process fluid channel can have a relatively low thermal conductivity and/or a relatively low electrical conductivity. It is noted that a low electrical conductivity is necessary if an electric field is also used during a separation process to enhance the separation. In such an aspect, if the spacers do not have a sufficiently low electrical conductivity, the spacers can potentially act as a "short" between the electrodes on either side of the process fluid channel. Preferably, the spacers in a process fluid channel can be formed from a material that is compatible with the process fluid. In other words, the spacers can be resistant to interaction with "solvents" corresponding to process fluids and optionally corresponding to any solvents used for cleaning the process fluid channel. Additionally or alternately, the spacers can be formed from a material that has a similar thermal expansion coefficient relative to the materials of the walls of the process fluid channel. Examples of non-conductive, non-reactive materials for the support structures in the process fluid channel can include polymer materials such as polyethyl ether ketone (PEEK), polytetrafluoroethylene (PTFE), other fluorinated polymer materials, composite materials such as materials with carbon fibers held in a fluorocarbon resin matrix (such as Vespel® CR-6100 available from DuPont), other polymer materials, and/or non-conducting ceramic materials.

In the process fluid channel, the support structures or spacers can correspond to disks that are in contact with both interior surfaces of the process fluid channel. It is noted that referring to the support structures or spacers as "disks" is meant to be inclusive, so that column-like support structures with a height either greater than or less than the diameter of the structure are also included within the meaning of the term "disk" as used herein for describing support structures in the process fluid gap. The disks can be arranged in any convenient manner within the process fluid gap, so long as the disks allow for a substantially non-turbulent flow of the process fluid within the separation channel.

By having an internal support structure in the heating channels and/or cooling channels, as well as optionally having (disk-like) support structures or spacers in the process fluid channel, the exterior surfaces of the heating and cooling channels that form the process fluid channel can be maintained as smooth, parallel surfaces to within a desired tolerance. This can allow the width of the process fluid channel to be maintained to within a desired tolerance over the length and height of the process fluid channel. In various aspects, the tolerance for variations in the width of the process fluid channel can be to have variations in the width of the process fluid channel of about 0.1 mm or less, such as about 0.05 mm or less, or about 0.02 mm or less, or about 0.01 mm or less.

During operation, a heating fluid is passed through the heating fluid channel and a cooling fluid is passed through the cooling fluid channel. This allows for control of the temperature of the walls separating the heating fluid channel, cooling fluid channel, and the process fluid separation channel.

Any convenient type of fluid can be used for the heating fluid and/or the cooling fluid. In some aspects, the heating fluid and cooling fluid can be selected so that at least a portion of the energy delivered or received by the heating fluid/cooling fluid is delivered or received based on a phase transition of the fluid. For example, one option for a heating fluid/cooling fluid system is to use condensing steam as the heating fluid and evaporating water as the cooling fluid. The amount of energy required to change the temperature of liquid water by about 1° C. is about 1 cal/g (4.2 J/g). The amount of energy required to similarly change the temperature of steam by about 1° C. is about 0.5 cal/g (2.1 J/g). By contrast, the amount of energy absorbed when water is vaporized (or released when steam is condensed) is more than about 500 cal/g (2 kJ/g), such as about 540 cal/g at 100° C. Based on these values, a fluid near a phase transition has the potential to deliver or absorb substantially greater amounts of energy for a given amount of fluid, due to the two order of magnitude difference between a fluid heat capacity and a heat of vaporization. Thus, it can be beneficial to use a fluid that undergoes a phase transition at a desired temperature as the heating fluid, the cooling fluid, or as both a heating fluid and a cooling fluid, It is noted that there is no requirement that the heating fluid and the cooling fluid are based on the same type of fluid. Suitable fluids for use as a heating fluid and/or a cooling fluid include water, a water/ethanol azeotropic mixture, other azeotropic mixtures involving water, or other fluids that have a phase transition in a region of phase space suitable for use in a heating channel or cooling channel. In order to match a desired temperature for the heating channel or the cooling channel to the phase transition of the fluid in the channel, the pressure in the channel can be varied. For example, the boiling point of water at about 14.7 psi (101 kPa) is about 100° C. By increasing the pressure in a channel to about 70 psi (480 kPa), the boiling point can be increased to about 150° C. Similarly, by decreasing the pressure in a channel to about 10 psi (70 kPa), the boiling point can be reduced to about 90° C. These values demonstrate that varying the pressure for operating a heating channel or cooling channel can allow for variation in the operating temperature for the channel. This can allow the temperature differential across the process fluid gap to be selected at a desired value while still maintaining the heating fluid and/or the cooling fluid at a condition where the fluid is operating at or near a phase transition.

In various aspects, the use of condensing steam (or another condensing fluid) as the heat source and an evaporating water stream (or another vaporizing fluid) as the cold stream can provide one or more advantages. For example, as noted above, use of condensing/vaporizing fluids can allow substantially larger temperature gradients to be achieved across the process fluid channel compared to the use of liquid-phase heat transfer fluids, such as Dowtherm™. Another potential benefit is that the heating fluid and cooling fluid streams can be made extremely clean, so that fouling does not occur. This can allow for increased service time between maintenance shutdowns, as well as potentially allowing for improved steady performance. Still another potential advantage is that the temperature gradient across the process channel can be varied as needed and/or the temperatures used to achieve a desired temperature gradient can be varied as needed by modifying the pressure in the heating channel and/or the cooling channel. Instead of having to alter the choice of heating fluid or cooling fluid, changing the pressure in the channel can allow for selection of a new temperature at which the desired phase transition occurs. For example, a change in base stock or other process fluid that is being separated may benefit from using a different temperature gradient. Such a new base stock for separation can be accommodated by adjusting the pressure in one or both of the heating channels and the cooling channels. Yet another potential benefit is that steam- and water-based systems can offer safety benefits relative to other choices for heating and cooling fluids. Steam/water based systems are typically not flammable, and usually correspond to fluid flows already present in a plant or refinery for processing fluids. Optionally, anti-fouling and/or anti-corrosive additives may be added in trace amounts as needed to reduce or minimize fouling within the channels and/or to prevent degradation of the surfaces.

Figure 2:
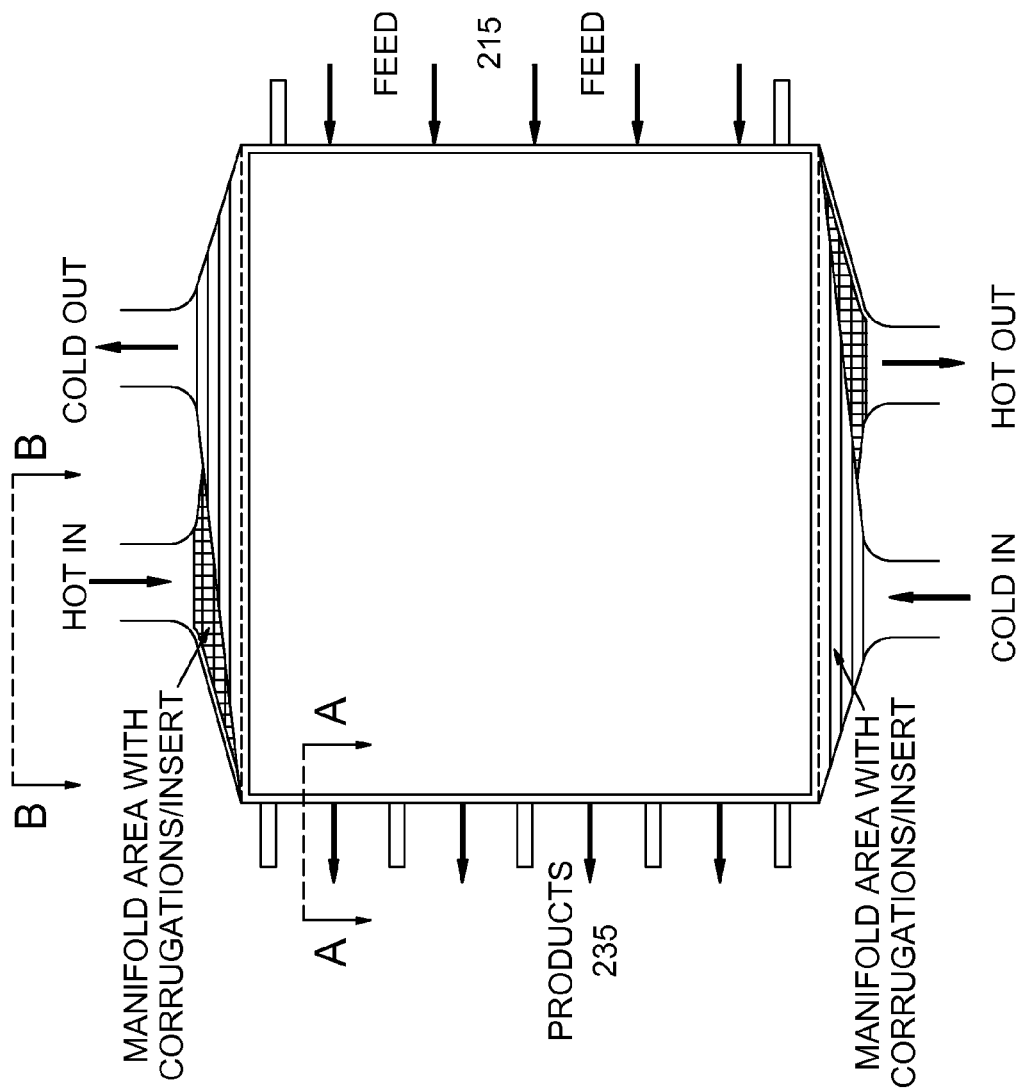
FIG. 2 schematically shows a view of a separation device for performing thermal diffusion separations.
Figure 3:
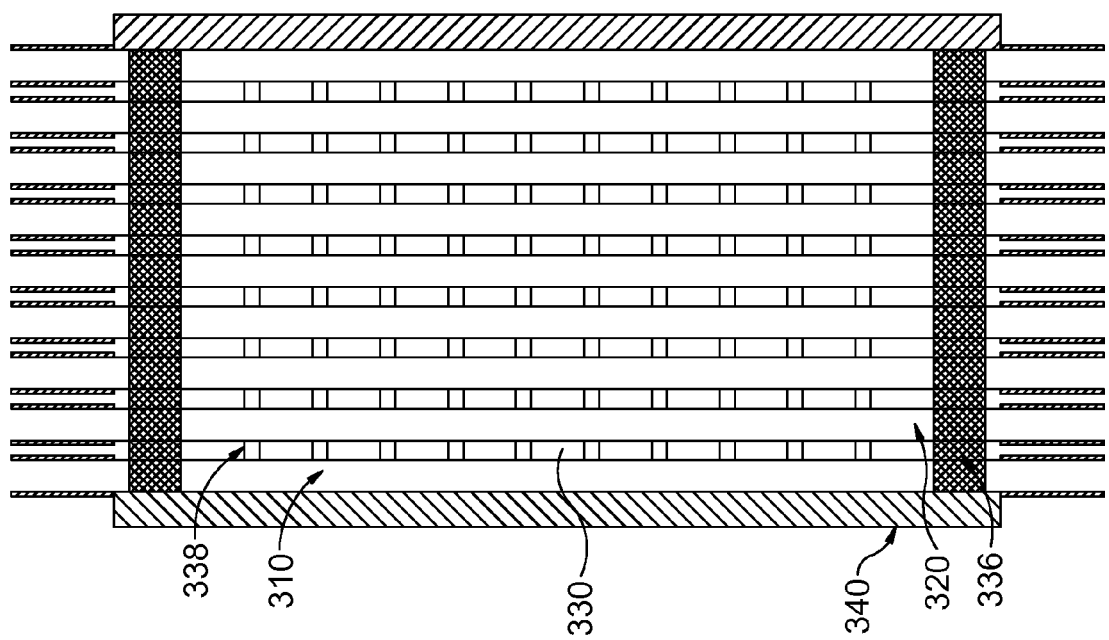
FIG. 3 schematically shows another view of a separation device for performing thermal diffusion separations.

FIGS. 2 and 3 schematically show an example of a system for using a plurality of heating channels, cooling channels, and process fluid separation channels for performing a thermal diffusion separation (or more generally a field enhanced separation) on a process fluid. The system shown in FIGS. 2 and 3 includes modularized heating channels 310 and cooling channels 320 that are assembled into larger unit, such as a unit measuring an overall size of about 1 m$^3$ to about 2 m$^3$. The process fluid channels 330 are defined based on the assembly of the heating channels 310 and the cooling channels 320. The size of the unit can vary depending on the desired amount of process fluid for separation, the number of systems that will be used, and/or other factors.

For the system schematically shown in FIGS. 2 and 3, each heating channel or cooling channel can be composed of two flat plates that are separated by about 1 mm to about 10 mm, such as about 5 mm to about 10 mm. The space between the two plates can be "filled" with a rigid mesh, an open cell reticulated metallic foam, or another internal structure that allows flow of steam and/or water (or other heating/cooling fluids) through the channel with little or no flow resistance and/or pressure drop. The mesh or foam internal structure may be brazed to the two plates on either side. Prior to this brazing, the outer periphery of the two plates can be formed in such a way that a self-containing channel may be made. For example, the outer edges of the plates can be welded together (e.g., electrical-resistance or laser welding) while also allowing two ports, such as one at the top and another at the bottom, for heating fluid or cooling fluid to flow through the channel. Other options can include gluing or otherwise bonding the plates together, or using a combination of gaskets and compression to form sealed channels. These channels may also be provided with manifold areas with corrugations and/or inserts to provide a substantially uniform flow across the channel cross-section.

FIG. 2 provides a view from a direction that is substantially perpendicular to the flow of the heating fluid, the flow of the cooling fluid, and the flow of the process fluid that is being separated. FIG. 3 shows a view that is rotated by about 90 degrees, so that the view is roughly aligned with the direction of flow for the process fluid. As shown in FIG. 3, the various heating channels 310 and cooling channels 320 can be placed between two pressure plates 340. This can allow pressure to be applied to the assembly of channels, such as by using tensioning bolts (not shown) located around the outer periphery (similar to those used in plate-and-frame heat exchanger units), to form a separation apparatus unit.

Figure 4:
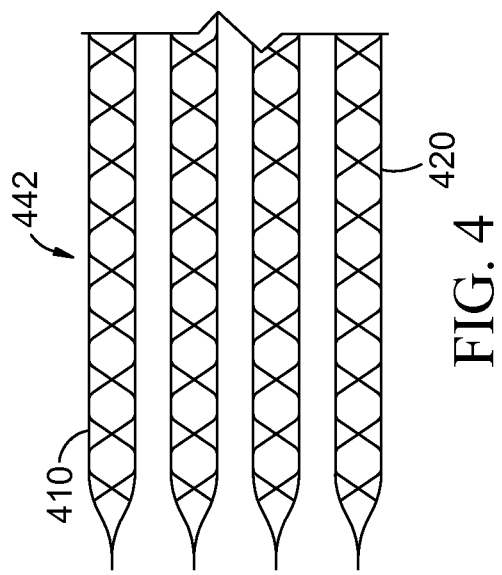
FIG. 4 schematically shows a cross-sectional view of a portion of a separation device.

FIG. 4 schematically shows a view of cross-section "A" noted in FIG. 2. FIG. 4 shows an example of how a pair of plates can be welded together to form channels. As shown in FIG. 4, the edges of each pair of plates can be welded together to provide a sealed channel 410 or 420 for a heating fluid and/or a cooling fluid. FIG. 4 also shows a crinkled-wire internal structure 442 to form an open cell framework structure within the channels.

In the example shown in FIG. 2, the process fluid (feed) 215 can enter on the right side of the separation apparatus. Based on the expected velocities for a process fluid entering the process fluid separation channel(s), it is believed that various types of manifolds can be used to achieve a uniform flow distribution. After passing through the process fluid separation channels for a suitable amount of time or residence time, the resulting separated process fluid products 235 can be withdrawn. Some form of manifold can be used on the outlet side (left side of FIG. 2) to avoid remixing of the separated streams. An example of a potential manifold structure for capturing the separated fluid streams from the system is shown in FIG. 2. Multiple product outlet ports along the height of process fluid separation channels are located at the left side of separator. The outlet port sizes/dimension can be varied to accommodate the different viscosity of the separated product streams. This manifold design will ensure a uniform product flow rate from the separator. Additionally or alternately, partition plates can be installed at various locations along the height of the process fluid separation channel(s) according to the desired properties for one or more of the separated product streams.

Figure 5:
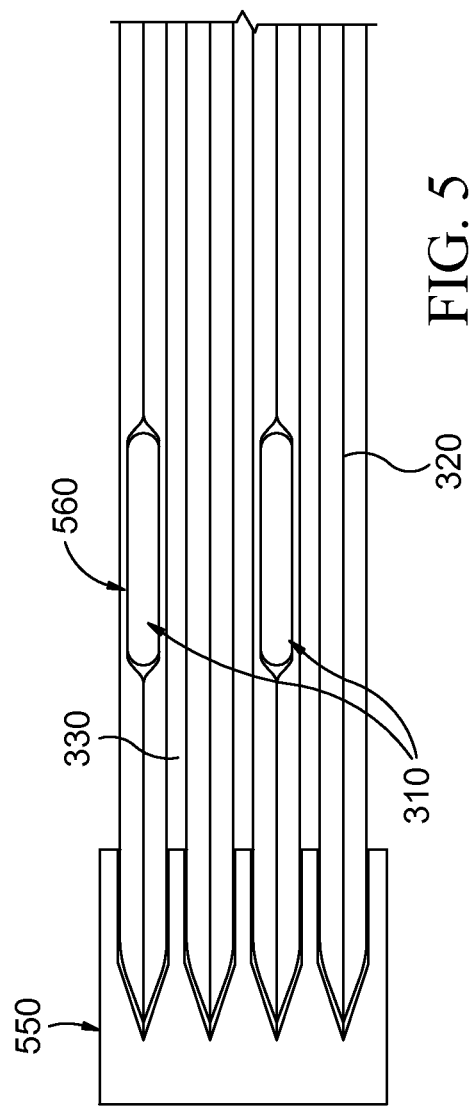
FIG. 5 schematically shows a cross-sectional view of a portion of a separation device.

FIG. 5 schematically shows a plan view of several channels corresponding to view "B" noted in FIG. 2. The view in FIG. 5 provides further details regarding an example of the port design for allowing fluids to enter or exit a heating channel/cooling channel. In the example shown in FIG. 5, when welding two plates together as shown in FIG. 4, an opening can be left for each of the ports. A flattened tube 560 can be placed in this port area and through welded to provide a sealed channel. The outer end of the flattened tube can then be attached to a manifold (not shown) to enable heating fluid or cooling fluid to pass in and out of the channel.

After forming the heating channels and cooling channels, such as by brazing and welding as described above, each module can optionally be machined slightly on a milling machine or the like and then optionally polished/honed to obtain a substantially flat surface and/or a uniform thickness for the module. By providing a substantially flat surface and/or a uniform thickness, the heating channel modules and cooling channel modules can be combined to form process fluid separation channels having a substantially uniform width across the extent of the separation channel.

FIG. 3 schematically shows an example of an assembled group of heating fluid channels 310 and cooling fluid channels 320 to form a plurality of process fluid separation channels. In the example shown in FIG. 3, the heating fluid channels 310 and cooling fluid channels 320 can be alternated as these channels are assembled into a complete unit. Non-conducting sealing (e.g., gaskets) 336 can be provided between channels. Further, button-shaped spacers 338 composed of a non-conducting material (such as poly ethyl ether ketone) can be placed between channels to facilitate achieving a uniform width for the process fluid separation channel. While the gap corresponding to the process fluid separation channel may be as small as 0.25 mm, economics can be improved as the width of the channel is increased, such as to a width of about 6 mm or less. By assembling heating fluid channels and cooling fluid channels, structures with a plurality (such as a large plurality) of process fluid channels can be formed. Such structures can be grouped to allow for assembly of any desired number of a process fluid channels, in order to form an overall apparatus or structure having sufficient throughput to handle a desired commercial volume of process fluid.

Figure 6:
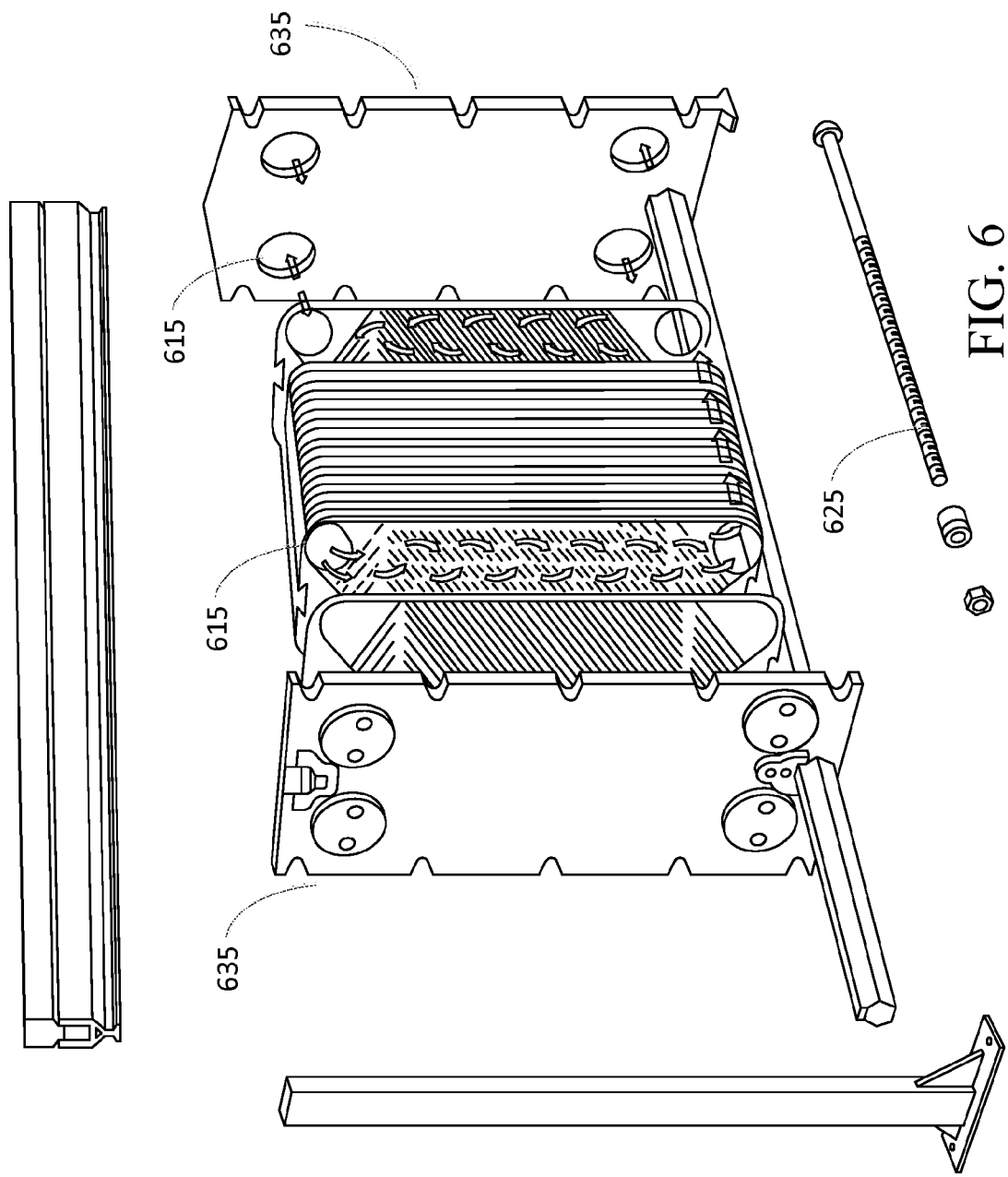
FIG. 6 schematically shows a partially assembled view of a separation device.

FIG. 6 shows another example of how a system for performing separations on a process fluid can be assembled from various channels. In the example in FIG. 6, plate arrangements similar to gasketed plate-and-frame exchangers (a conventional technology) with a port 615 at each corner of plates may be used. As shown in FIG. 6, the end covers 635 for the assembly can be held together using a compression bolt 625 or another convenient type of structure for providing a compression force. However, unlike a conventional plate-and-frame exchanger which typically has corrugated plates, the apparatus shown in FIG. 6 can use flat plates to form the separation channels. Preferably, a filler material may be used between plates and two plates may be welded together or otherwise firmly attached together to form hot and cold channels (or modules). When two channels are brought together, such as one each for the hot fluid and cold fluid, a process fluid gap or channel is created between them. Optionally, button-type spacers can be placed in the process fluid channel. Optionally, during assembly of a structure such as the one shown in FIG. 6, the structure can be assembled using semi-welded channels that allow fine machining as a final step to arrive at a precise thickness for each of the heating/cooling modules, thereby ensuring a desired tolerance can be met for the process fluid channel width.

When constructing an apparatus corresponding to a plurality of separation channels, such as an apparatus as shown in FIG. 6, suitable materials for constructing the apparatus can be selected based on the constraint that the separation process is typically performed at temperatures below 200° C. and at pressures near to ambient pressure. For metal parts, suitable metals can include steel (including stainless steel), aluminum, copper, and other alloys. For non-metallic parts where polymer and/or plastic materials are indicated as suitable in this description, suitable materials can include PTFE, PEEK, composite materials (such as carbon fibers in a polymer matrix), other fluorocarbon polymers, and/or other polymers with suitable chemical resistance and thermal expansion properties. Still other suitable materials for various parts can include ceramics (including their composites), moldable/blowable glass, and silicone sheets or slabs.

An additional benefit of the various types of modular constructions described above for a separation apparatus is that the apparatus can disassembled to allow for mechanical cleaning of the process fluid spacing between the modules. This can be achieved, for example, by carefully separating the channels from one another (starting from one end of the unit), and cleaning them one by one. It is noted that having substantially long flattened tube portions can enable such separation of the modules. Following a mechanical cleaning, the gaskets for separating the heating/cooling fluid channels and/or the button-shaped separators in the process fluid separation channel can be replaced. Optionally, chemical cleaning of the process fluid channel may be performed without taking the unit apart. Since such cleaning may not be 100% effective, the ability to perform mechanical cleaning (at least on an occasional basis) is believed to be desirable. As an example of a maintenance schedule, three chemical cleanings may be performed before carrying out a mechanical cleaning. If desired, the heating fluid channels and cooling fluid channels may also be cleaned using a chemical solution.

Electric Field Enhancement

In order to further improve the separation efficiency for a separator based on liquid thermal diffusion, an electric field can be used to enhance the rate of separation. In particular, an electric field that is applied along the width of the separator can increase the rate of diffusion for molecules within the gap based on dielectrophoresis.

In a typical petroleum feedstock or other hydrocarbon feed, the vast majority of molecules or particles within the feed will be neutral and will not have a net charge. If a uniform electric field is applied to a liquid feed that contains molecules or particles without a net charge, the uniform electric field will have only a minimal impact on the diffusion of molecules within the liquid. A uniform electric field may be effective for aligning molecules with dipole moments, but no net translational force will be exerted on the molecules or particles in the liquid.

By contrast, dielectrophoresis corresponds to diffusion of molecules in a non-uniform electric field based on the permittivity (i.e., complex dielectric constant) of the molecules. The electric field can be a spatially varying electric field, a time varying electric field, or a combination thereof. In diffusion based on dielectrophoresis, the electric field will induce a dipole in the various species contained in a fluid exposed to the electric field. While such an induced dipole will not result in a translational force in a uniform electric field, in a non-uniform electric field the induced dipole can result in a translational force based on the gradient of the field. In general, species with a permittivity that is greater than the permittivity of the surrounding medium will diffuse toward areas of stronger electric field, while species with a permittivity that is less than the surrounding medium will diffuse toward areas of weaker electric field.

Equation 3 shows a general formula for the flux of molecules (or other species) within a liquid based on various types of diffusion. In Equation 3, the flux for a molecule or species $J_i$ (in kg/m$^2$s) corresponds to a first term based on mass diffusion (or Brownian motion), a second term based on thermal diffusion, and a third term based on dielectrophoretic diffusion.

$$J_i = -\rho D_{m,i} \nabla Y_i + D_{T,i} \frac{\nabla T}{T} + D_{E,i} \nabla (E^2) \tag{3}$$

In Equation 3, $\rho$ is the density of the fluid, $D_{m,i}$ is the mass or Brownian motion diffusion constant for species i, and $Y_i$ is the concentration of species i in the fluid; $D_{T,i}$ is the thermal diffusion constant (or thermal diffusivity) for species i and T is the temperature; and $D_{E,i}$ is the electrophoretic diffusion constant for species i, and E is the electric field. In Equation 3, the first term (corresponding to Brownian motion) tends to cause mixing of species within the fluid. By contrast, the second term (corresponding to thermal diffusion) and the third term (corresponding to dielectrophoresis) tend to promote separation of species within a fluid. However, based only on Equation 3, the separation promoted by the second term (thermal diffusion) is not necessarily aligned with the separation caused by the third term (dielectrophoresis).

In a petroleum or hydrocarbon-type feed, paraffinic type molecules will tend to have smaller induced dipoles while aromatic molecules will tend to have larger induced dipoles. As a result, a properly aligned non-uniform electric field can be used to enhance a liquid thermal diffusion process. A non-uniform electric field with lower field near the hot wall will tend to enhance the diffusion of paraffins toward the hot wall. Similarly, a higher electric field near the cold wall will tend to enhance the diffusion of aromatics toward the cold wall.

A variety of potential configurations are available for providing a non-uniform electric field in the gap between the hot and cold surfaces of a separator using liquid thermal diffusion. One option is to simply use an electric field generator that can generate an oscillating electric field, which results in temporal field variations. This would allow for generation of a varying electric field even if the electrodes generating the field were two parallel plate electrodes. Additionally or alternately, a number of options are available for generating a spatially varying electric field.

One simple example of a spatially varying electric field is to use plate electrode on both sides of the gap corresponding to the process fluid channel, with one of the electrodes being patterned to allow an insulating material to be deposited into the grooves/volumes formed as a result of the pattern. In a limiting case, if the insulating portions are sufficiently small and/or the gap between the electrodes is sufficiently large, the formation of the patterned insulation regions on the surface of the plate electrode could still end up replicating the effects of a plate electrode, resulting in little or no spatial variance in the electric field. However, as long as the width of the gap is not substantially larger than the spacing between electrodes (such as 50 times larger or 100 times larger), forming a patterned insulation layer on the surface of an electrode can result in a spatially varying electric field with gradients that can induce dielectrophoretic diffusion. Other options for forming a spatially varying field can include substituting a plate electrode with a plurality of point source electrodes, (or approximate point sources), small plate electrodes with distances between the plates, and or protruding electrodes.

With regard to incorporating electrodes into a device for enhancing a thermal diffusion separation with an electric field gradient, one option can be to use the heating channels and the cooling channels (or the walls of the channels) as the electrodes. In this type of aspect, the walls of the heating channels and cooling channels can be formed at least in part from a conductive material, such as aluminum, copper, iron, steel, or another conductive metal. The walls of the heating channels and cooling channels can be coated with a coating layer so that the surface exposed to the heating fluid, cooling fluid, and the process fluid is substantially stable in the presence of the fluid(s). Examples of suitable coating layers can be polymer layers, such as a layer of PEEK, PTFE or another fluorinated polymer; ceramic layers; or layers of a refractory oxide that is inert with respect to the heating fluid, the cooling fluid, and/or the process fluid. Alternatively, in some aspects the metal electrode may be sufficiently stable without a coating layer, such as by forming the channel walls from stainless steel. However, a coating can typically be preferable in situations where it is desirable to reduce or minimize the possibility of an electrical "short" forming between the opposing surfaces of the process fluid channel.

If a varying electric field is desired across the process fluid channel, the metal surface of one or both of the exterior channel walls (i.e., the walls in contact with the process fluid channel) can be etched or otherwise patterned to create a volume in the metal surface. The pattern volume created in the metal surface can then be filled with an insulating material, such as a fluorinated polymer or a refractory oxide. The coating layer for the channel wall can then be deposited on top of the patterned surface to provide a passivated electrode surface that can provide a varying electric field.

Figure 7:
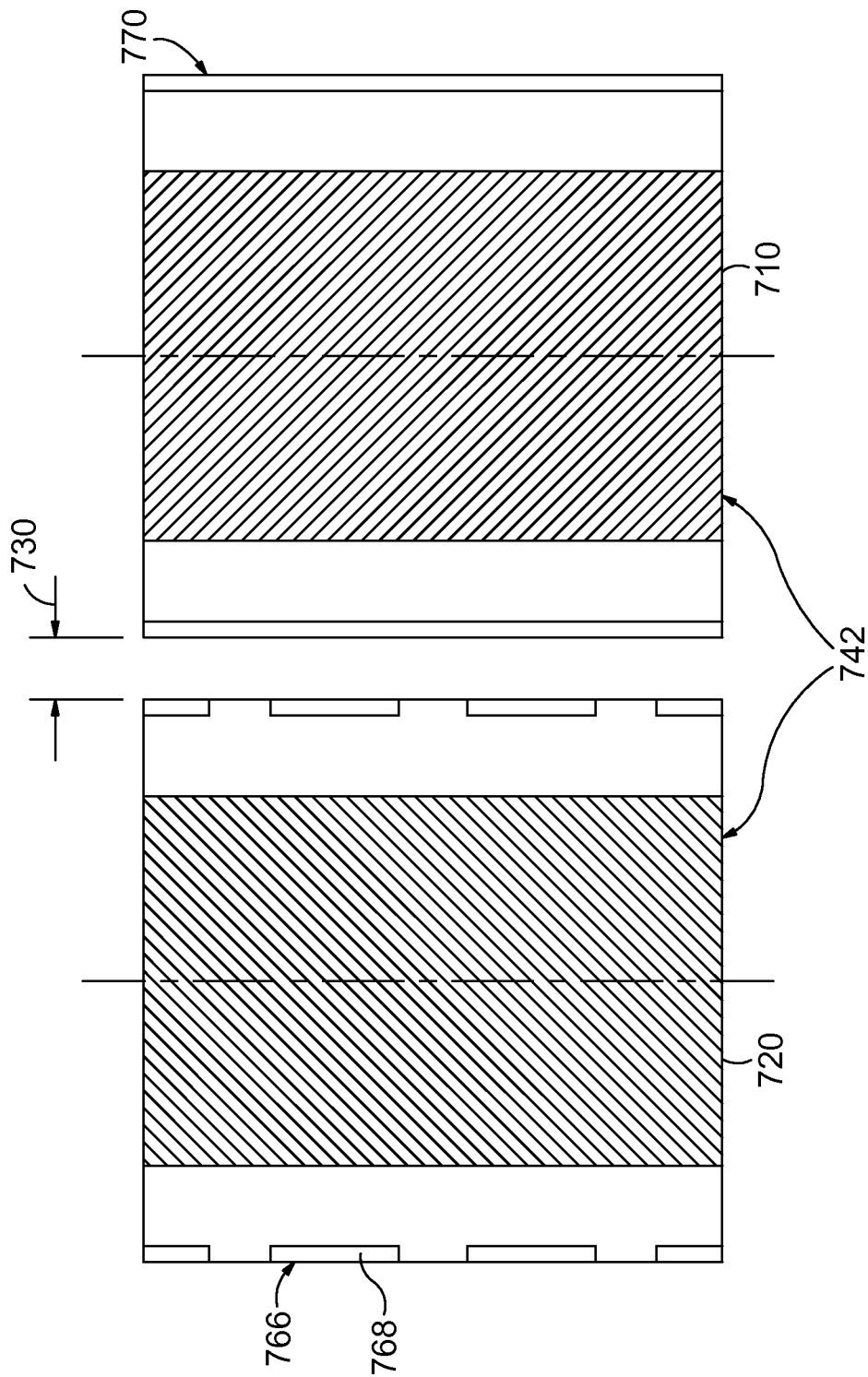
FIG. 7 schematically shows an example of various channels in a separation device.

FIG. 7 shows an example of a process fluid channel 730, with a corresponding heating fluid channel 710 and cooling fluid channel 720, where the walls of the cooling fluid channel are patterned to provide for a varying electric field in the process fluid channel. In the example shown in FIG. 7, an open reticulated metallic foam 742 is schematically shown to form an open cell framework structure in the channels. In the example shown in FIG. 7, in order to enable application of a uniform or non-uniform electric field without short-circuiting across the process channel space, the walls of the heating fluid module, the cooling fluid module, or both modules can be coated on the outer surfaces with a durable material 770. The coating material can provide adequate chemical and thermal stability against the feed, electrical insulation and sufficient mechanical integrity to withstand compressive forces exerted by, for example, tightening bolts used to hold the modules in the assembly in the desired position. As shown in FIG. 7, photo-etched or machined grooves 766 may be used on the cold channel surfaces to provide discrete locations for the non-uniform electric field. These grooves can be filled with an insulating material 768 to assist with maintaining a smooth surface for the process fluid channel to within a desired tolerance. The electric field gradient may be constant along the length of the separation apparatus or varied along the length of the unit to further enhance the separation.

Figure 8:
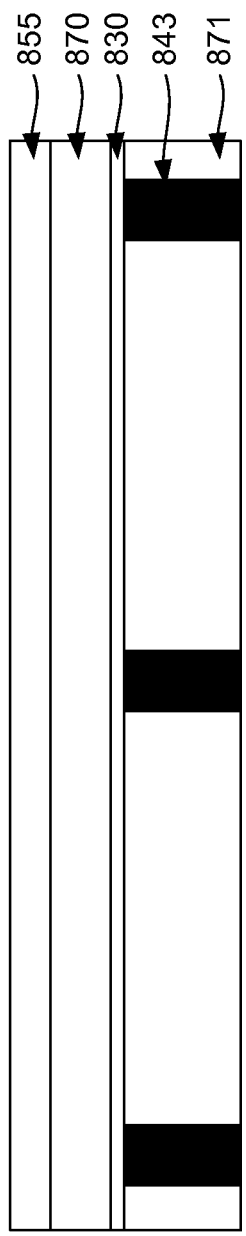
FIG. 8 schematically shows an example of a configuration for providing an electric field across a process fluid channel.

FIG. 8 schematically shows another example of a design for a process fluid channel that can provide a variable electric field within the process fluid channel. In FIG. 8, for one of the walls of the process fluid channel, the design is similar to FIG. 7. For ease of reference, this side will be described with reference to the heating fluid channel. In FIG. 8, a wall between the heating fluid channel (not shown) and the process fluid channel 830 includes a plate electrode 855 and a durable electrically insulating material 870. The durable electrically insulating material 870 provides the material surface that is adjacent to the process fluid channel 830. Optionally, the durable electrically insulating material 870 could include a coating. Glass or PEEK are examples of potentially suitable materials for the durable electrically insulating material 870.

For the other side of the process fluid channel (corresponding to the cooling fluid channel side in the example shown in FIG. 8), the wall between the cooling fluid channel (not shown) and the process fluid channel 830 does not include a plate electrode. Instead, a plurality of rod electrodes 843 are used. The plurality of rod electrodes are contained within a layer of durable electrically insulating material 871, such as a layer of PEEK. Based on the design shown in FIG. 8, a variable electric field can be projected between the plate electrode 855 and the plurality of rod or rod-like electrodes 843. In this discussion, rod-like electrodes is defined to include rod electrodes. For example, rod-like electrodes can refer to electrodes that may have a cross-section more similar to a rectangular or elliptical cross section, as opposed to a round cross section. In some aspects, rod-like electrodes can resemble electrode strips contained within an insulating material, where the width of the strip is preferably roughly parallel to the direction of fluid flow in the process fluid channel. The strength of this electric field, as well as the variations of the electric field strength in the process fluid channel, can be dependent on the spacing between the rod electrodes 843, the distance between the rod electrodes and the plate electrode, and the width of the process fluid channel. It is noted that use of a plate electrode on the cooling fluid channel side and rod electrodes on the heating fluid channel side is also contemplated, as well as use of rod electrodes on both the heating fluid channel side and the cooling fluid channel side.

As an example of a configuration, the thickness of the plate electrode shown in FIG. 8 can be from about 1 mm to about 5 mm, such as about 3 mm; the thickness of the insulating material 870 can be from about 1 mm to about 5 mm, such as about 1.6 mm; the width of the rod-like electrodes 843 can be about 1 mm to about 3 mm, such as about 1.6 mm; the spacing between the rod-like electrodes can be about 2 mm to about 15 mm, such as about 3 mm; and the process fluid channel width can be a width for a process fluid channel as previously described.

Additionally or alternatively, in a configuration where a plurality of rod-like electrodes are used to provide electrodes for at least one side of the process fluid channel, the width of the rod-like electrodes can vary, or each rod-like electrode can have a similar width. Additionally or alternately, the spacing or distance between adjacent rod-like electrodes (along the direction roughly parallel to the direction of process fluid flow) can be greater than or equal to the average width of the rod-like electrodes. This can correspond to an average spacing between electrodes being greater than the average width of the electrodes, or this can correspond to having the spacing between each electrode being greater than the average width. Having a spacing that is at least about the average width of the rod-like electrodes can assist with providing variations in the electric field within the process fluid channel.

Separation Products

A field enhanced separation can be used to generate a plurality of products, and preferably at least three products, from an input feed to a separator. Similar to a fractionator, the plurality of products can be withdrawn from a liquid thermal diffusion separator at various heights. The number of different products withdrawn from a separator can depend on the types of desired products and the nature of the input feed to the separator.

As an example, the output streams from a liquid thermal diffusion separator can be withdrawn from a plurality of ports located at various heights relative to the height of the separation unit. Ports near the top of the separation unit can typically produce output streams corresponding to higher viscosity index and/or paraffinic components, while ports near the bottom of the separation unit can typically produce output streams corresponding to lower viscosity index and/or aromatic components. The number of ports can be any convenient number. At least two ports are required, as otherwise any separation performed in the process fluid channel would be effectively lost due to recombination of the fluid in the single output port. In some aspects, the number of output ports can correspond to ports at from two to ten different heights.

One option for providing output ports for a group of thermal diffusion separators is to combine the outputs from a plurality of separators in an output manifold. The separated fluids from the various process fluid channels can enter the output manifold and then be withdrawn via output ports at desired heights. This can reduce the number of output flows that require separate management.

It is noted that during operation, relatively constant pressure drops across the various output ports can preferably be maintained. If the pressure drop across one output port varies relative to a second output port, the flow rate toward the lower pressure drop will be increased, leading to recombination of separated material to provide the extra flow rate in the lower pressure drop region. For example, for separations where the viscosity of the expected products in the plurality of output ports is modified relative to the feed, the size of the output ports may need to be varied to provide a relatively similar pressure drop for each output port.

In an aspect where a general separation of a lubricant boiling range feed is desired, a variety of products can be derived using a field enhanced separation, such as a separation based on liquid thermal diffusion. The separation can generate one or more wax fractions; one or more basestock fractions, including one or more fractions for various types of basestocks, such as Group I or Group II/III basestocks; one or more other fractions such as alkylnaphthalene fractions or diesel fractions; one or more extender oil fractions; and/or a combination of any of the above. In some aspects, an advantage of using liquid thermal diffusion for separation is the ability to separate out fractions that roughly correspond to various viscosity index (VI) components of a feed. In the list of fractions mentioned above, the wax fractions represent the highest VI components, with Group II/III basestocks being next highest in VI. The trend from high to low VI can continue down through the various fractions to the extender oil, which represents the lowest VI fraction.

One example of a use for a field enhanced separation (such as a liquid thermal diffusion separation) is to debottleneck existing solvent extractions units. Using a field enhanced separation can allow for lower severity conditions and an increase in yield across existing solvent extraction units. For example, a liquid thermal diffusion separator can operate on the back end of a solvent extraction unit to upgrade the resulting viscosity index (VI) of the raffinate. This can allow the solvent extraction unit to operate at a lower severity. The liquid thermal diffusion separator, which is more selective for separating based on VI, can then perform a final separation to achieve a desired VI value. This can allow for an increase in yield at a given VI value. In addition to upgrading the VI of the resulting raffinate, a field enhanced separation method can also dewax the raffinate at the same time to produce wax in addition to other products (i.e. Group III lube, Group II lube, alkylnaphthalenes, Group I lube and extender oil).

A field enhanced separation process (such as liquid thermal diffusion) can also operate on the extract stream from a solvent dewaxing unit to separate out desirable lubricant boiling range molecules and/or high VI components from the extract stream. Without being bound by any particular theory, it is believed that 10%-30% of high VI components are left behind in the extract of a typical solvent dewaxing process due to the imperfect separation quality of the solvent extraction process. By separating out high VI components from the extract, the resulting yield of Group I, II, or III lube is increased. In addition, the inventive process may also separate out alkylnaphthalenes and extender oil from the extract at the same time as separating out the high VI components.

More generally, a field enhanced separation process (such as a liquid thermal diffusion separation process) can be used to replace a solvent extraction and/or solvent dewaxing process in a process flow. Both extraction and dewaxing separations can occur during one stage of a field enhanced separation. In addition, further processing such as deoiling of wax is typically not necessary due to the multiple product output streams that can be generated.

Another option is to use a liquid thermal diffusion separator to operate on a slip stream to produce products of special quality and/or high value which are of limited demand. The disclosure may also provide blend stocks at a competitive price on an integrated project economic basis.

Still another option is to use a liquid thermal diffusion separator to remove material that could produce deposits, such as potential contaminant materials encountered in used lubricant streams and bio-derived streams. In this aspect, the field enhanced separation would serve as a pretreatment step. A field enhanced separation may also be used to isolate desired polymers from a polymer stream.

A field enhanced separation may also isolate linked ring structures (C30) from a feed. The linked ring structures can assist in preserving the viscosity of single ring structures. However, in a conventional separation process, linked ring structures are often separated from single ring structures based on boiling point differences or solubility differences.

A field enhanced separator can that generates multiple products can include one product outflow that is enriched in the desired linked ring structures.

A field enhanced separation may include various strategies to perform a separation and/or concentrate a desired component. Such strategies may include multi-staging, skimming, reverse skimming, and recycling. In order to achieve a desired yield of various products, multi-staging may occur such that more than one process step is employed. All products, a subset of products, or a combination of blend components from one unit or stage may enter into a second unit or stage as incoming feedstock. Multiple stages may be employed to achieve the desired end result.

Skimming may occur on a feedstock to selectively remove a desired component from the bulk feed (i.e. wax). The feedstock may be any feed containing the desired component (i.e. crude, VGO, raffinate, bio based feeds, etc.). In contrast, reverse skimming may include removing the bulk unwanted component(s) from the feedstock, such as multi-ring aromatics, so as to concentrate high VI components. Reverse skimming may be combined with multi-staging such that after the bulk unwanted components are removed in the first stage, the desired components can be further separated or refined in subsequent stages. Skimming may also be combined with multi-staging.

Recycling is another strategy to concentrate a desired component. For example, when separating out wax, the first two or three ports of a thermal diffusion or thermal electric diffusion separator may contain wax or highly paraffinic components. It may be desired to separate out all the possible wax molecules in the bulk feedstock. As a result, one strategy is to collect both as much wax and as much oil in wax as possible by taking products from the first several ports as opposed to just the top port which may be essentially oil free and pure wax. In order to remove the oil in wax from the ports of interest, it is necessary to recycle a portion of the stream to further refine the wax and remove the oil. This method is a strategy to not only separate out more wax molecules from a feedstock but also a strategy to concentrate the wax such that it is deoiled with no additional processing steps required.

Combinations of strategies may be employed and desired to achieve necessary yields or specific products. In addition, strategies may be used to blend components or molecular classes from the various product ports together in various combinations to achieve desired yields, product composition of matter, and product performance. Furthermore, the strategy of blending components from various ports may be done in combination with multi-staging, skimming, reverse skimming, and recycling. For example, blends from one processing step may be used as feed for a second processing step, a blend may be skimmed or reverse skimmed as well as recycled.

As a specific example of a separation strategy, one option can be to perform a liquid thermal diffusion separation (optionally enhanced by use of an electric field) so that the density of an output fraction from the separation unit is increased relative to the density of the process fluid by a desired amount, such as a desired percentage of the process fluid density. Another output fraction can have a corresponding decrease in density relative to the process fluid density. Mathematically, this can be expressed as having one output fraction with a density of at least $d_{feed}+\Delta d$, and another fraction with a density of $d_{feed}-\Delta d$ or less. In such a strategy, the $\Delta d$ can correspond to at least 1% of the $d_{feed}$ value, or at least 2%, or at least 3%, or at least 4%, or at least 5% and/or about 10% or less.

As another option, the separation strategy can correspond to increasing/decreasing the amount of a given molecular class within two output fractions by a desired amount relative to a baseline amount of the molecular class present in the initial feed. In this type of strategy, a molecular class can refer to paraffins, aromatics, naphthenes, and/or other identifiable components within a feed that are miscible but have a different density. Thus, a molecular class separation could lead to an increase in paraffins in a first fraction and an increase in aromatics in a second fraction. For example, the separation can be performed to generate a first output fraction with a concentration of a desired molecular class of $C_{feed}+\Delta C$ and a second output fraction with a concentration of $C_{feed}-\Delta C$. In this type of strategy, $C_{feed}$ can correspond to a weight percentage of the desired molecular class in the feed or process fluid. $\Delta C$ can represent an absolute value for change in the weight percentage, or $\Delta C$ can correspond to a value that is scaled based on the original concentration of the molecular class in the feed. For an absolute value, the change in weight percentage $\Delta C$ can be at least about 5 wt %, or at least about 10 wt %, or at least about 15 wt %, and up to the $(1-C_{feed})$ wt % of the molecular class in the original feed. For a relative value, $\Delta C$ can correspond to a value that is at least 10% of $C_{feed}$, or at least 20% of $C_{feed}$, or at least 35% of $C_{feed}$, or at least 50% of $C_{feed}$, and up to 100% of $C_{feed}$.

Examples of Separation

The following examples describe potential configurations for performing thermal enhanced diffusion separations on a commercial scale. In the examples, experimental data and supplemental calculations are used to determine the number of separation modules that would be needed to perform a desired separation on a feed corresponding to 15 kilobarrels per day (kbd). Results from the experiments and calculations are shown in FIGS. 9 and 10.

In this example, a "module" refers to a field enhanced separation unit having dimensions of roughly 2 m×2 m×2 m. The dimensions exclude the size of any frame or other supporting structures that are used to hold the components of the module together. The components of the module are heating channels and cooling channels as described above, with separation gaps between the heating channels and cooling channels at various spacings. Based on the different spacings for the separation gaps, a module can have different total numbers of heating/cooling channels.

As a baseline, an initial set of experiments was performed on a module with a separation gap (i.e., process fluid channel) width of 0.254 mm. A Dowtherm™ heat transfer fluid used as the heating fluid and the cooling fluid. A set of baseline experiments were based on using the heating fluid and cooling fluid to maintain a temperature gradient across the separation gap of 5.1 K. A lubricant base oil type feedstock was passed through the module at various flow rates corresponding to residence times ranging from about 4 to about 8 hours. During operation, the energy required to maintain the desired temperature gradient across the separation gap was measured.

Based on the measured values at a gap width of 0.254 mm and the temperature gradient of 5.1 K, calculations were performed for the number of modules that would be required to process a commercial flow of about 15 kbd, and the corresponding energy that would be required based on various gap widths. FIG. 9 shows the calculations for various residence times and various separation gap widths at a temperature differential of 5.1 K. In FIGS. 9 and 10, for each combination of gap width and residence time, the top number corresponds to the number of modules while the bottom number corresponds to the required energy in MW. As shown in FIG. 9, increasing the gap width can reduce the number of modules required to maintain a fluid within the separation gap for a given amount of residence time.

Calculations were also performed based on a larger temperature differential of 62.24 K. For this type of temperature differential, different heating and cooling fluids would need to be used, such as using evaporating and condensing steam. The results for the calculation at the larger temperature gradient (and based on the alternative heating/cooling fluids) are shown in FIG. 10. For FIG. 10, the calculations included an assumption that a similar separation can be performed at a higher temperature in a shorter residence time, with the amount of temperature increase being proportional to the amount of reduction in the residence time. The results from the calculations shown in FIG. 10 show that the amount of energy required for separating a 15 kbd feed stream is not substantially altered by increasing the temperature differential across the separation gap, but the number of modules can be dramatically reduced based on the reduced residence time needed for a given level of separation.

Additional Embodiments

Embodiment 1

A system for performing a field enhanced separation comprising: a heating fluid channel comprising: heating fluid channel parallel plates separated by a heating fluid channel width, the heating fluid channel parallel plates each having an interior surface and an exterior surface, the interior surfaces of the heating fluid channel parallel plates defining a heating fluid channel volume, the heating fluid channel parallel plates corresponding to a first heating plate and second heating plate; a first open cell framework structure within the heating fluid channel volume, the first open cell framework structure contacting the interior surfaces of the first heating plate and the second heating plate at a plurality of points; at least one heating fluid inlet; and at least one heating fluid outlet, the first open cell framework structure providing fluid communication between the at least one heating fluid inlet and the at least one heating fluid outlet; a cooling fluid channel comprising: cooling fluid channel parallel plates separated by a cooling fluid channel width, the cooling fluid channel parallel plates each having an interior surface and an exterior surface, the interior surfaces of the cooling fluid channel parallel plates defining a cooling fluid channel volume, the cooling fluid channel parallel plates corresponding to a first cooling plate and second cooling plate; a second open cell framework structure within the cooling fluid channel volume, the second open cell framework structure contacting the interior surfaces of the first cooling plate and the second cooling plate at a plurality of points; at least one cooling fluid inlet; and at least one cooling fluid outlet, the second open cell framework structure providing fluid communication between the at least one heating fluid inlet and the at least one heating fluid outlet; a process fluid channel formed by the exterior surface of the first heating plate and the exterior surface of the first cooling plate, the exterior surface of the first heating plate and the exterior surface of the first cooling plate being substantially parallel, the process fluid channel having a process fluid channel width of from 0.25 mm to 6.0 mm, at least one process fluid input in fluid communication with the process fluid channel; and a plurality of process fluid output ports in fluid communication with the process fluid channel, the plurality of process fluid output ports being at two or more different heights relative to a height of the process fluid channel.

Embodiment 2

The system of Embodiment 1, wherein the process fluid channel height is 0.25 m to 3.0 m, for example at least 0.25 m, or at least 0.5 m, or at least 1.0 m, or at least 1.5 m, and/or 3.0 m or less, or 2.5 m or less, or 2.0 m or less, or 1.5 m or less.

Embodiment 3

The system of Embodiment 2, wherein a ratio of the process fluid channel width to the process fluid channel height is 1600 or less, or 1500 or less, or 1000 or less, or 500 or less, and optionally at least 100.

Embodiment 4

The system of any of the above embodiments, wherein the process fluid channel width is at least 1.5 mm to 6.0 mm, or at least 1.5 mm, or at least 2.0 mm, or at least 2.5 mm, or at least 3.0 mm, and/or 6.0 mm or less, or 5.0 mm or less, or 4.0 mm or less, or 3.0 mm or less.

Embodiment 5

The system of any of the above embodiments, wherein the process fluid channel width is maintained within a tolerance of 0.1 mm or less in the process fluid channel, or 0.05 mm or less.

Embodiment 6

The system of any of the above embodiments, further comprising a plurality of spacers within the process fluid channel, the spacers contacting the exterior surface of the first heating plate and the exterior surface of the first cooling plate at a plurality of points.

Embodiment 7

The system of any of the above embodiments, wherein at least one of the first open cell framework structure and the second open cell framework structure comprises an open cell reticulated metal foam, a wire mesh structure, or a combination thereof.

Embodiment 8

The system of any of the above embodiments, wherein the heating fluid channel width, the cooling fluid channel width, or both the heating fluid channel width and the cooling fluid channel width is 1 mm to 10 mm, or 5 mm to 10 mm.

Embodiment 9

The system of any of the above embodiments, wherein the first heating plate and the first cooling plate comprise electrodes for providing an electric field within the process fluid channel.

Embodiment 10

The system of Embodiment 9, wherein the exterior surface of the first heating plate, the exterior surface of the first cooling plate, or a combination thereof comprises a coating layer, wherein optionally the exterior surface of the first heating plate, the exterior surface of the first cooling plate, or a combination thereof is patterned underneath the coating layer, the patterned portion containing an insulating material.

Embodiment 11

The system of Embodiment 9, wherein the first heating plate, the first cooling plate, or a combination thereof comprises a plurality of rod-like electrodes, and optionally wherein a) a spacing between each rod-like electrode of the plurality of rod-like electrodes is greater than or equal to an average width of the rod-like electrodes, or b) an average spacing between the plurality of rod-like electrodes is greater than or equal to an average width of the plurality of the rod-like electrodes.

Embodiment 12

The system of any of the above embodiments, further comprising a second process fluid channel formed by the exterior surface of the second heating plate and an exterior surface of a third cooling plate, the third cooling plate being a cooling fluid channel parallel plate of an additional cooling fluid channel.

Embodiment 13

The system of any of the above embodiments, wherein the at least one process fluid input is in fluid communication with an input manifold.

Embodiment 14

The system of any of the above embodiments, wherein the plurality of process fluid output ports are in fluid communication with the process fluid channel via an output manifold.

Embodiment 15

The system of any of the above embodiments, wherein the plurality of process fluid output ports comprise process fluid output ports located at from two to ten different heights relative to the height of the process fluid channel All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A system for separating petroleum fractions and/or other hydrocarbon fractions in the presence of a thermal field and optionally an electric field comprising:
    a heating fluid channel comprising:
        heating fluid channel parallel plates separated by a heating fluid channel width, the heating fluid channel parallel plates each having an interior surface and an exterior surface, the interior surfaces of the heating fluid channel parallel plates defining a heating fluid channel volume, the heating fluid channel parallel plates corresponding to a first heating plate and second heating plate;
        a first open cell framework structure within the heating fluid channel volume, the first open cell framework structure contacting the interior surfaces of the first heating plate and the second heating plate at a plurality of points;
        at least one heating fluid inlet; and
        at least one heating fluid outlet, the first open cell framework structure providing fluid communication between the at least one heating fluid inlet and the at least one heating fluid outlet;
    a cooling fluid channel comprising:
        cooling fluid channel parallel plates separated by a cooling fluid channel width, the cooling fluid channel parallel plates each having an interior surface and an exterior surface, the interior surfaces of the cooling fluid channel parallel plates defining a cooling fluid channel volume, the cooling fluid channel parallel plates corresponding to a first cooling plate and second cooling plate;
        a second open cell framework structure within the cooling fluid channel volume, the second open cell framework structure contacting the interior surfaces of the first cooling plate and the second cooling plate at a plurality of points;
        at least one cooling fluid inlet; and
        at least one cooling fluid outlet, the second open cell framework structure providing fluid communication between the at least one heating fluid inlet and the at least one heating fluid outlet;
    a process fluid channel formed by the exterior surface of the first heating plate and the exterior surface of the first cooling plate, the exterior surface of the first heating plate and the exterior surface of the first cooling plate being substantially parallel, the process fluid channel having a process fluid channel width of from 0.25 min to 6.0 mm,
    at least one process fluid input in fluid communication with the process fluid channel for the petroleum fraction and/or other hydrocarbon fraction; and
    a plurality of process fluid output ports in fluid communication with the process fluid channel for separating the petroleum fraction and/or other hydrocarbon fraction, the plurality of process fluid output ports being at two or more different heights relative to a height of the process fluid channel.

2. The system of claim 1, wherein the process fluid channel height is 0.25 in to 3.0 m.

3. The system of claim 2, wherein a ratio of the process fluid channel width to the process fluid channel height is 1000 or less.

4. The system of claim 1, wherein the process fluid channel width is at least 1.5 min.

5. The system of claim 1, wherein the process fluid channel width is 6.0 mm or less.

6. The system of claim 1, wherein the process fluid channel width is maintained within a tolerance of 0.1 mm or less in the process fluid channel.

7. The system of claim 1, further comprising a plurality of spacers within the process fluid channel, the spacers contacting the exterior surface of the first heating plate and the exterior surface of the first cooling plate at a plurality of points.

8. The system of claim 1, wherein at least one of the first open cell framework structure and the second open cell framework structure comprises an open cell reticulated metal foam.

9. The system of claim 1, wherein at least one of the first Open cell framework structure and the second open cell framework structure comprises a wire mesh structure.

10. The system of claim 1, wherein the heating fluid channel width is 1 mm to 10 mm.

11. The system of claim 1, wherein the cooling fluid channel width is 1 mm to 10 mm.

12. The system of claim 1, wherein the first heating plate and the first cooling plate comprise electrodes for providing an electric field within the process fluid channel.

13. The system of claim 12, wherein the exterior surface of the first heating plate, the exterior surface first cooling plate, or a combination thereof comprises a coating layer.

14. The system of claim 13, wherein the exterior surface of the first heating plate, the exterior surface first cooling plate, or a combination thereof is patterned underneath the coating layer, the patterned portion of the exterior surface containing an insulating material.

15. The system of claim 12, wherein the first heating plate, the first cooling plate, or a combination thereof comprises a plurality of rod electrodes.

16. The system of claim 15, wherein an average spacing between the plurality of rod electrodes is greater than or equal to an average width of the plurality of the rod electrodes.

17. The system of claim 1, further comprising a second process fluid channel formed by the exterior surface of the second heating plate and an exterior surface of a third cooling plate, the third cooling plate being a cooling fluid channel parallel plate of an additional cooling fluid channel.

18. The system of claim 1, wherein the at least one process fluid input is in fluid communication with an input manifold.

19. The system of claim 1, wherein the plurality of process fluid output ports are in fluid communication with the process fluid channel via an output manifold.

20. The system of claim 1, wherein the plurality of process fluid output ports comprise process fluid output ports located at from two to ten different heights relative to the height of the process fluid channel.

* * * * *